United States Patent [19]

Kobayashi

[11] Patent Number: 5,486,421
[45] Date of Patent: Jan. 23, 1996

[54] CURABLE POLYMER RELEASE COATING COMPOSITION

[75] Inventor: Hideki Kobayashi, Ichihara, Japan

[73] Assignee: Dow Corning Toray Silicone Company, Ltd., Tokyo, Japan

[21] Appl. No.: 338,914

[22] Filed: Nov. 14, 1994

[30] Foreign Application Priority Data

Nov. 25, 1993 [JP] Japan .................... 5-321025

[51] Int. Cl.$^6$ ..................... B32B 27/00
[52] U.S. Cl. .......... 428/421; 428/447; 428/450; 525/104; 525/478; 526/245; 526/279
[58] Field of Search ............ 525/104, 478; 526/245, 279; 428/421, 447, 450

[56] References Cited

U.S. PATENT DOCUMENTS

| | | | |
|---|---|---|---|
| 4,736,048 | 4/1988 | Brown et al. | 556/454 |
| 4,772,672 | 9/1988 | Isozaki et al. | 526/279 |
| 4,954,586 | 9/1990 | Toyoshima | 526/245 |
| 5,128,389 | 7/1992 | Inukai et al. | 526/279 |
| 5,132,366 | 7/1992 | Kashida et al. | 525/104 |
| 5,166,294 | 11/1992 | Kishita et al. | 525/478 |
| 5,332,795 | 7/1994 | Fujiki et al. | 525/478 |

FOREIGN PATENT DOCUMENTS

| | | | |
|---|---|---|---|
| 62-038419 | 2/1987 | Japan | 526/245 |
| 63-262604 | 10/1988 | Japan . | |

*Primary Examiner*—Mark D. Sweet
*Attorney, Agent, or Firm*—Alexander Weitz

[57] ABSTRACT

There is disclosed a polymer composition which can cure rapidly to provide a release coating that has a low surface tension, said composition comprising:

(A) a fluorine-containing polymer that contains at least 2 alkenyl groups in each molecule, said polymer being obtained by the copolymerization of
 (a) an acrylic monomer having the general formula $CH_2=CX-COOR'$ wherein X is selected from the group consisting of hydrogen and a methyl radical and R' denotes a monovalent hydrocarbon group having 4 to 15 carbon atoms which contain at least one $-CF_2-$ group, and
 (b) a silicone macromonomer with the general formula $CH_2=CX-COO-Q-(RMeSiO)_n-Me_2SiR''$ wherein X has its previously defined meaning, Q denotes a divalent hydrocarbon group having 1 to 8 carbon atoms, R is selected from the group consisting of methyl radical and fluorine-containing monovalent hydrocarbon group having 3 to 8 carbon atoms, Me represents a methyl radical, R" denotes a alkenyl group having 2 to 6 carbon atoms and n is an integer having a value of at least 1;

(B) an organohydrogenpolysiloxane that contains at least 3 silicon-bonded hydrogen atoms in each molecule;

(C) a hydrosilylation catalyst; and (D) a hydrosilylation catalyst inhibitor.

20 Claims, No Drawings

CURABLE POLYMER RELEASE COATING COMPOSITION

FIELD OF THE INVENTION

The invention relates to a curable polymer composition. More specifically, the invention relates to a fluorine-containing curable polymer composition that employs an organohydrogenpolysiloxane as a crosslinker and cures rapidly to give a low-surface-tension release coating.

BACKGROUND OF THE INVENTION

It has long been known that products capable of releasing tacky substances (e.g., pressure-sensitive adhesives) can be prepared by forming a cured release coating on the surface of many different types of substrates, such as paper, plastic films, synthetic fiber fabrics, and so forth. The curable organopolysiloxane composition disclosed in Japanese Patent Application Laid Open Number Sho 63-320 is one example of an agent that will produce such a cured release coating. This particular curable organopolysiloxane composition is composed of a diorganopolysiloxane that contains both vinyl and fluoroalkyl groups, an organohydrogenpolysiloxane, and a platinum compound. Several drawbacks are, however, associated with this curable organopolysiloxane composition; it has a slow cure rate and its release performance can be poor. Moreover, because its silicone component can migrate into tacky substances, such as pressure-sensitive adhesives, it can impair the tack of pressure-sensitive adhesives.

SUMMARY OF THE INVENTION

The invention takes as its object the introduction of a curable polymer composition that solves the problems described above. In specific terms, the present invention takes as its object the introduction of a curable polymer composition that cures rapidly into a low-surface-tension release coating.

The invention thus relates to a curable polymer composition comprising:

(A) a fluorine-containing polymer that contains at least 2 alkenyl groups in each molecule which is obtained by the copolymerization of (a) an acrylic monomer with the general formula $$CH_2=CX-COOR'$$

wherein X denotes hydrogen or methyl and R' denotes a $C_4$ to $C_{15}$ monovalent organic group that contains the $-CF_2-$ group and (b) a silicone macromonomer with the general formula $$CH_2=CX-C-O(O)-Q-(RMeSiO)_n-Me_2SiR''$$

wherein X is defined as above, Q denotes a $C_1$ to $C_8$ divalent hydrocarbon group, R is methyl or a $C_3$ to $C_8$ fluorine-containing monovalent hydrocarbon group, Me is methyl, R'' denotes a $C_2$ to $C_6$ alkenyl group, and n is an integer with a value of at least 1;

(B) an organohydrogenpolysiloxane that contains at least 3 silicon-bonded hydrogen atoms in each molecule;

(C) a hydrosilylation catalyst; and (D) a hydrosilylation catalyst inhibitor.

The present invention has been disclosed in Japanese Laid Open Patent Application Number Hei 5-321025, the full disclosure of which is hereby incorporated by reference.

DETAILED DESCRIPTION OF THE INVENTION

To explain the preceding in greater detail, the fluorine-containing polymer (A) used in the present invention is the base component of the invention composition, and it must contain at least 2 alkenyl groups in each molecule in order to crosslink with the organohydrogenpolysiloxane comprising component (B). The fluoropolymer consists of a copolymer of (a) an acrylic monomer with the general formula $CH_2=CX-COOR'$ and (b) a silicone macromonomer with the general formula $CH_2=CX-COO-Q-(RMeSiO)_n-Me_2SiR''$.

X in the general formula for component (a) denotes hydrogen or a methyl radical, and (a) is therefore an acrylate ester or methacrylate ester. R' denotes a $C_4$ to $C_{15}$ monovalent hydrocarbon group that contains the $-CF_2-$ group and is exemplified by the following:

$-CH_2(CF_2)_4F$, $-CH_2(CF_2)_4H$, $-CH_2CH_2(CF_2)_4F$, $-CH_2CH_2(CF_2)$ $-CH_2(CF_2)_6F$, $-CH_2(CF_2)_8H$, $-CH_2CH_2(CF_2)_8F$, and $-CH_2CH_2(CF_2)_6H$.

The silicone macromonomer (b) has the general formula $CH_2=CX-COO-Q-(RMeSiO)_n-Me_2SiR''$, in which Me is methyl, X is hydrogen or methyl, and n is an integer with a value of at least 1. The preferred range for n is 20 to 500 because this range affords compositions with particularly good curabilities. R denotes methyl or a $C_3$ to $C_8$ fluorine-containing monovalent hydrocarbon group. In addition to methyl, R is specifically exemplified by 3,3,3-trifluoropropyl, 3,3,4,4,5,5,6,6,6-nonafluorohexyl, and so forth. Q denotes $C_1$ to $C_8$ divalent hydrocarbon groups, and Q is generally exemplified by methylene, ethylene, propylene, and so forth. R'' denotes a $C_2$ to $C_6$ alkenyl, and is exemplified by vinyl, allyl, propenyl, butenyl, pentenyl, and hexenyl, with vinyl, allyl, and hexenyl being preferred.

The copolymerization reaction between acrylic monomer (a) and silicone macromonomer (b) is run as a radical reaction in the presence of an initiator. The polymerization initiator (radical source) used here is not critical, and is exemplified by organoperoxides such as dicumyl peroxide, di(tert-butyl) peroxide, benzoyl peroxide, cumene hydroperoxide, and so forth; and by azo compounds such as azobisisobutyronitrile, azobisisobutyrate esters, azodibenzoyl, tetramethyltetrazene, and so forth. Azo compounds are preferred from the standpoint of preserving the alkenyl in the silicone macromonomer.

This copolymerization reaction can be run with or without solvent. The use of solvent is safer and more reliable since it facilitates control of the reaction. The following solvents are recommended: aromatic solvents such as benzene, toluene, and xylene; aliphatic solvents such as hexane and heptane; ethers such as tetrahydrofuran and diethyl ether; alcohols such as methanol, ethanol, propanol, and butanol; ketones such as acetone, methyl ethyl ketone, and methyl isobutyl ketone; esters such as ethyl acetate and butyl acetate; chlorinated hydrocarbons such as carbon tetrachloride, trichloroethane, and chloroform; fluorinated aromatic hydrocarbons such as trifluoromethylbenzene, 1,3-bis(trifluoromethyl)benzene, methylpentafluorobenzene; dimethylformamide; and dimethyl sulfoxide, inter alia. The preceding solvents may also be used in combinations of two or more.

The copolymerization reaction is run at a temperature at which the initiator is decomposed and is run until monomer conversion reaches a set or desired value. This reaction may be run at elevated, reduced, or ambient pressure, and it is desirable to monitor monomer conversion, for example, by gas chromatography. Since monomer conversion is strongly dependent on the particular reaction conditions, such as the type of initiator, type of solvent, monomer concentration, etc., the optimal conditions must typically be determined by routine experiment.

The component (B) used in the invention composition functions as a crosslinker and consists of an organohydrogenpolysiloxane that contains on average at least 3 silicon-bonded hydrogen atoms in each molecule in order to obtain an excellent curability.

The silicon-bonded organic groups present in component (B) are specifically exemplified by non-alkenyl monovalent hydrocarbon groups, for example, alkyl groups such as methyl, ethyl, propyl, butyl, pentyl, and so forth; aryl groups such as phenyl, tolyl, xylyl, and so forth; and aralkyl groups such as benzyl, phenethyl, and so forth. The pendant groups in component (B) may also include fluorine-containing organic groups, as specifically exemplified by groups with the general formulas $C_kF_{2k+1}$—$R^3$— and $C_kF_{2k+1}$—$R^3$—O—$R^3$— in which $R^3$ denotes a divalent hydrocarbon group and k is an integer with a value of 1 to 20. The divalent hydrocarbon groups encompassed by $R^3$ in the preceding formulas are specifically exemplified by alkylene such as methylene, ethylene, methylmethylene, propylene, butylene, and so forth; arylene such as phenylene, tolylene, xylylene, and so forth; alkylenearylene such as methylenephenylene, ethylenephenylene, and so forth; and arylenealkylene.

For purposes of compatibility with the component (A) used in the invention composition, each molecule of component (B) preferably contains at least 1 perfluoroalkyl-containing $C_3$ to $C_{12}$ monovalent hydrocarbon group.

The organohydrogenpolysiloxane (B) is specifically exemplified by trimethylsiloxy-endblocked dimethylsiloxanemethylhydrogensiloxane copolymers, dimethylhydrogensiloxy-endblocked methyl(perfluorobutylethyl)siloxanemethylhydrogensiloxane copolymers, trimethylsiloxy-endblocked methyl(perfluorobutylethyl)siloxane-dimethylsiloxanemethylhydro gensiloxane copolymers, trimethylsiloxy-endblocked methyl(perfluorohexylethyl)siloxane-methylhydrogensiloxane copolymers, and copolymers composed of methyl(perfluorobutylethyl)siloxane, dimethylhydrogensiloxane, and $SiO_2$ units.

The mixing proportions for components (A) and (B) in the invention composition are not critical. However, these two components are preferably mixed so as to obtain values of 0.2/1 to 5/1 for the molar ratio of alkenyl groups in component (A) to silicon-bonded hydrogen in component (B). Outside this range, either the rate of cured film formation by the composition is very slow or the cured film yielded by the composition has a substantially diminished release performance.

The hydrosilylation catalyst comprising the component (C) used by the invention composition is a catalyst of the crosslinking and curing of components (A) and (B). Component (C) is specifically exemplified by very finely divided platinum adsorbed on a carbon powder carrier, chloroplatinic acid, alcohol-modified chloroplatinic acid, olefin complexes of chloroplatinic acid, chloroplatinic acid/divinyldisiloxane coordination compounds, platinum black, palladium catalysts, and rhodium catalysts. This component should be added in a catalytic quantity, and is generally added in the range of 0.1 to 100 weight parts per 1,000,000 weight parts component (A).

The hydrosilylation catalyst inhibitor comprising component (D) of the invention composition is used to improve the room-temperature stability of the composition by inhibiting the catalytic activity of the hydrosilylation catalyst at room temperature. Subject component (D) is exemplified by alkynyl alcohols such as 3-methyl-1-butyn-3-ol, 3,5-dimethyl-1-hexyn-3-ol, 3-methyl-1-pentyn-3-ol, phenylbutynol, and so forth, and also 3-methyl- 3-penten-1-yne, 3,5-dimethyl-1-hexyn-3-ene, cyclotetra(methylvinylsiloxane), bis(2-methoxyisopropyl) maleate, and benzotriazole.

The composition of the invention may be diluted with organic solvent as desired. Said organic solvent is nonexhaustively exemplified by ethers such as tetrahydrofuran and so forth; ketones such as methyl isobutyl ketone and so forth; aromatic hydrocarbons such as trifluorotoluene, hexafluoroxylene, and so forth; halogenated hydrocarbons such as trichloroethylene, perchloroethylene, 1,1,1-trichloroethane, dichloroethane, 1,1,2-trichlorotrifluoroethane, and so forth; HCFC solvents such as $CHCl_2CF_3$(HCFC123) and $CH_3CCl_2F$ (HCFC141b); and fluorinated aromatic hydrocarbons such as trifluoromethylbenzene, 1,3-bis(trifluoromethyl)benzene, methylpentafluorobenzene, and so forth. The use of organic solvent is preferred in view of the corresponding improvements in the storage stability of the composition and in its coatability on various substrates.

The invention composition is prepared by mixing the above-described components (A)–(D), or components (A)–(D) plus organic solvent, to homogeneity. However, various additives may also be added insofar as the object of the invention is not impaired. These additives are exemplified by inorganic fillers such as fumed silica, precipitated silica, fused silica, quartz powder, silica gel, silica balloons, carbon black, mica, talc, calcium carbonate, glass fiber, iron oxide, titanium oxide, alumina, aluminum hydroxide, and diatomaceous earth; oils such as silicone oils, mineral oils, and hydrocarbon oils; as well as dyes, coloring pigments, oxidation inhibitors, heat stabilizers, and flame retardants.

The curable polymer composition of the invention will form a low-surface-tension cured film on the surface of a variety of substrates, such as glass sheet, metal sheet, paper, plastic films, fabrics, and so forth, when heated after having been coated thereon. Heating is suitably carried out, for example, for 20 seconds to 30 minutes at temperatures of 120° C. to 150° C. The resulting cured film has a low surface tension, and the present composition therefore provides a cured film that has an excellent releasability as well as an excellent water repellency and oil repellency. In addition, the cured film afforded by the curable polymer composition of the invention also exhibits excellent release properties against pressure-sensitive adhesives and particularly silicone-based pressure-sensitive adhesives.

Thus, by virtue of its ability to cure into a low-surface-tension coating, the curable polymer composition of the invention will be useful for providing cured release films that are water repellent, and/or oil repellent. The invention composition is particularly useful as a release agent for silicone-based pressure-sensitive adhesives.

EXAMPLES

The invention is explained below in greater detail through working examples, in which "parts" designates "weight parts", the viscosity is the value measured at 25° C., and Me indicates the methyl group.

Example 1

The following were mixed and heated to 90° C.: 100 g of a mixture of acrylic monomers with the formulas $CH_2=CH-COOC_2H_4(CF_2)_mF$ in which m=6, 8, 10, and 12, 10 g of silicone macromonomer with the formula $CH_2=CHCOOC_2H_4-(CF_3C_2H_4SiMeO)_n-Me_2SiCH=CH_2$ in which the average value of n was 50, and 100 g of methyl isobutyl ketone. This was followed by the addition of 0.2 g azobisisobutyronitrile and heating for an additional 6 hours with stirring. The polymer subsequently precipitated by the addition of 300 g of methanol was recovered and designated as Synthesis Sample 1.

The following were dissolved in 494 parts of 1,3-bis(trifluoromethyl)benzene: 100 parts of Synthesis Sample 1, 3 parts of dimethylhydrogensiloxy-endblocked methyl(perfluorobutylethyl)siloxane-methylhydrogensiloxane copolymer with a viscosity of 20 centipoise, and 1 part of cyclotetra(methylvinylsiloxane). A curable polymer composition was then prepared by the addition of sufficient chloroplatinic acid/divinyltetramethyldisiloxane complex to give 500 ppm platinum metal. This composition was coated on the surface of a glass plate and heated for 3 minutes at 150° C. to give a cured film. The contact angles of water, methylene iodide, and n-hexadecane on this cured film were measured by the droplet method using a contact-angle meter from Kyowa Kaimen Kagaku Kabushiki Kaisha. In each case, measurements were carried out on 10 droplets, and the value reported for the contact angle is the average of the 10 measurements. The following results were obtained.

| substance | contact angle |
| --- | --- |
| water | 120° |
| methylene iodide | 102° |
| n-hexadecane | 70° |

Example 2

The following were mixed and heated to 90° C.: 100 g of perfluorooctylethyl methacrylate, 10 g of silicone macromonomer with the formula $CH_2=CHCOOC_2H_4-(Me_2SiO)_n-Me_2SiCH=CH_2$ in which the average value of n was 80, and 100 g of 1,3-bis(trifluoromethyl)benzene. This was followed by the addition of 0.2 g of azobisisobutyronitrile and heating for an additional 6 hours while stirring. The polymer subsequently precipitated by the addition of 300 g of methanol was recovered and designated as Synthesis Sample 2.

The following were dissolved in 494 parts of 1,3-bis(trifluoromethyl)benzene: 100 parts of Synthesis Sample 2, 3 parts of trimethylsiloxy-endblocked dimethylsiloxanemethylhydrogensiloxane copolymer with a viscosity of 3 centipoise, and 1 part of cyclotetra(methylvinylsiloxane). A curable polymer composition was then prepared by the addition of sufficient chloroplatinic acid/divinyltetramethyldisiloxane complex to give 500 ppm platinum metal. This composition was coated on the surface of a glass plate and heated for 3 minutes at 150° C. to give a cured film. This cured film was submitted to contact angle measurement as in Example 1, and the following results were obtained.

| substance | contact angle |
| --- | --- |
| water | 122° |
| methylene iodide | 101° |
| n-hexadecane | 71° |

Example 3

Curable polymer composition as prepared in Example 2 was coated at a rate of 0.2 g/m² on the surface of polyethylene resin film, and a cured film was obtained by heating for 3 minutes at 150° C.

The surface of this cured film was then coated with a dimethylpolysiloxane-based addition reaction-type silicone pressure-sensitive adhesive (SD4580 from Dow Corning Toray Silicone Company, Limited, Japan) followed by heating for 3 minutes at 100° C. Polyethylene resin film (Lumilar S-10 from Toray Kabushiki Kaisha, Japan) was applied to the treated surface to serve as backing material, and a measurement sample was fabricated by ageing for a prescribed period of time at 25° C. under a load of 20 g/cm². The measurement sample was then cut to a width of 2.5 cm to give a test specimen. The backing film was easily peeled off when peeled at 180° and a peel velocity of 0.3 m/minute using a tensile tester. After this peeling test, the test specimen was adhered on a stainless steel plate, and the force (in grams) required to peel the test specimen from the stainless steel was measured (180°, peel velocity=0.3 m/minute). This force was the same as the force required to peel an untreated reference tape, which indicated that no drop in adhesive strength due to silicone migration had occurred.

That which is claimed is:

1. A curable polymer composition comprising:

(A) a fluorine-containing polymer that contains at least 2 alkenyl groups in each molecule, said polymer being obtained by the copolymerization of (a) an acrylic monomer having the general formula $CH_2=CX-COOR'$ wherein X is selected from the group consisting of hydrogen and a methyl radical and R' denotes a monovalent hydrocarbon group having 4 to 15 carbon atoms which contain at least one $-CF_2-$ group, and (b) a silicone macromonomer with the general formula $CH_2=CX-COO-Q-(RMeSiO)_n-Me_2SiR''$ wherein X has its previously defined meaning, Q denotes a divalent hydrocarbon group having 1 to 8 carbon atoms, R is selected from the group consisting of methyl radical and fluorine-containing monovalent hydrocarbon group having 3 to 8 carbon atoms, Me represents a methyl radical, R" denotes an alkenyl group having 2 to 6 carbon atoms and n is an integer having a value of at least 1;

(B) an organohydrogenpolysiloxane that contains at least 3 silicon-bonded hydrogen atoms in each molecule, the amounts of (A) and (B) being selected so as to provide a molar ratio of alkenyl groups in component (A) to silicon-bonded hydrogen in component (B) of 0.2/1 to 5/1;

(C) a hydrosilylation catalyst; and (D) a hydrosilylation catalyst inhibitor.

2. The composition according to claim 1, wherein R' of said component (a) is selected from the group consisting of the structures —$CH_2(CF_2)_4F$,
—$CH_2(CF_2)_4H$,
—$CH_2CH_2(CF_2)_4F$,
—$CH_2CH_2(CF_2)_4H$,
—$CH_2(CF_2)_6F$,
—$CH_2(CF_2)_8H$,
—$CH_2CH_2(CF_2)_8F$ and
—$CH_2CH_2(CF_2)_6H$.

3. The composition according to claim 2, wherein R of said component (b) is selected from the group consisting of 3,3,3-trifluoropropyl, 3,3,4,4,5,5,6,6,6-nonafluorohexyl and methyl radicals.

4. The composition according to claim 3, wherein R" of said component (b) is selected from the group consisting of vinyl, allyl and hexenyl radicals.

5. The composition according to claim 4, wherein n of said component (b) is 20 to 500.

6. The composition according to claim 5, wherein Q of said component (b) is selected from the group consisting of methylene, ethylene and propylene groups.

7. The composition according to claim 1, wherein said organohydrogenpolysiloxane (B) contains at least one perfluoroalkyl-containing monovalent hydrocarbon group having 3 to 12 carbon atoms in each molecule.

8. The composition according to claim 7, wherein said organohydrogenpolysiloxane (B) is selected from the group consisting of trimethylsiloxy-endblocked dimethylsiloxane-methylhydrogensiloxane copolymers, dimethylhydrogensiloxy-endblocked methyl(perfluorobutylethyl)siloxane-methylhydrogensiloxane copolymers, trimethylsiloxy-endblocked methyl(perfluorobutylethyl)siloxane-dimethylsiloxane-methylhydrogensiloxane copolymers, trimethylsiloxy-endblocked methyl(perfluorohexylethyl)siloxane-methylhydrogensiloxane copolymers and copolymers composed of methyl(perfluorobutylethyl)siloxane units, dimethylhydrogensiloxane units and $SiO_2$ units.

9. The composition according to claim 8, wherein R' of said component (a) is selected from the group consisting of the structures —$CH_2(CF_2)_4F$,
—$CH_2(CF_2)_4H$,
—$CH_2CH_2(CF_2)_4F$,
—$CH_2CH_2(CF_2)_4H$,
—$CH_2(CF_2)_6F$,
—$CH_2(CF_2)_8H$,
—$CH_2CH_2(CF_2)_8F$ and
—$CH_2CH_2(CF_2)_6H$.

10. The composition according to claim 9, wherein R of said component (b) is selected from the group consisting of 3,3,3-trifluoropropyl, 3,3,4,4,5,5,6,6,6-nonafluorohexyl and methyl radicals.

11. The composition according to claim 10, wherein R" of said component (b) is selected from the group consisting of vinyl, allyl and hexenyl radicals.

12. The composition according to claim 11, wherein n of said component (b) is 20 to 500.

13. The composition according to claim 12, wherein Q of said component (b) is selected from the group consisting of methylene, ethylene and propylene groups.

14. The composition according to claim 1, further comprising an organic solvent.

15. The composition according to claim 7, further comprising an organic solvent.

16. A substrate coated with the cured composition according to claim 1.

17. A substrate coated with the cured composition according to claim 3.

18. A substrate coated with the cured composition according to claim 4.

19. A substrate coated with the cured composition according to claim 7.

20. A substrate coated with the cured composition according to claim 11.

* * * * *